(12) United States Patent
Alenkov et al.

(10) Patent No.: US 11,507,068 B2
(45) Date of Patent: Nov. 22, 2022

(54) METHOD FOR LIFE CYCLE MANAGEMENT OF A COMPLEX UTILITY FACILITY AND SYSTEM FOR ITS IMPLEMENTATION

(71) Applicants: JOINT-STOCK COMPANY ASE ENGINEERING COMPANY, Novgorod (RU); JOINT STOCK COMPANY "SCIENCE AND INNOVATIONS", Moscow (RU)

(72) Inventors: Vyacheslav Vladimirovich Alenkov, Moscow (RU); Serguey Viktorovich Yergopulo, Moscow (RU); Yevgeny Mikhaylovich Chebotarev, Voronezhskaya (RU); Filipp Mikhailovich Novodvorsky, Moscow (RU)

(73) Assignees: JOINT-STOCK COMPANY ASE ENGINEERING COMPANY, Novgorod (RU); JOINT STOCK COMPANY "SCIENCE AND INNOVATIONS", Moscow (RU)

(*) Notice: Subject to any disclaimer, the term of this patent is extended or adjusted under 35 U.S.C. 154(b) by 407 days.

(21) Appl. No.: 16/490,407

(22) PCT Filed: Mar. 1, 2017

(86) PCT No.: PCT/RU2017/000102
§ 371 (c)(1),
(2) Date: Aug. 30, 2019

(87) PCT Pub. No.: WO2018/160085
PCT Pub. Date: Sep. 7, 2018

(65) Prior Publication Data
US 2020/0012266 A1 Jan. 9, 2020

(51) Int. Cl.
G05B 19/418 (2006.01)
G06F 16/93 (2019.01)
G06F 16/9032 (2019.01)

(52) U.S. Cl.
CPC ..... *G05B 19/41885* (2013.01); *G05B 19/4188* (2013.01); *G06F 16/90328* (2019.01); *G06F 16/93* (2019.01)

(58) Field of Classification Search
CPC ......... G05B 19/41885; G05B 19/4188; G06F 16/93; G06F 16/90328
(Continued)

(56) References Cited

U.S. PATENT DOCUMENTS 9,678,949 B2* 6/2017 Monk, II ............... G06F 40/30
2011/0224953 A1* 9/2011 Webster ............... G06Q 10/10
703/1

(Continued)

OTHER PUBLICATIONS

Takata, Shozo, et al., "Computer-Aided Facility Life Cycle Management", CODIM 1999, Tokyo, Japan, Feb. 1-3, 1999, 6 pages.*
Kassem, Mohamad, et al., "BIM for Facilities Management: Evaluating BIM Standards in Asset Register Creation and Service Life Planning", ITcon, vol. 20, © 2015, 20 pages.*

(Continued)

*Primary Examiner* — Robert Stevens
(74) *Attorney, Agent, or Firm* — J. Miguel Hernandez; James R. Gourley; Carstens, Allen & Gourley, LLP

(57) ABSTRACT

A method for managing a life cycle of a complex engineering facility, comprising several steps. The steps include forming a facility structure of the facility; selecting constituent elements of the facility structure and the relationships between the constituent elements and a location of each of the constituent elements in a decomposition structure of the facility; forming a linked array of requirements related to the facility and to processes of implementation of the requirement for the facility; planning and accounting for the requirements in accordance with the structural decomposition of the facility, the requirements being assigned a (Continued)

certain status; and forming databases intended for storing an associated array of information about the constituent elements of the facility, the associated array of information comprising at least a plurality of documents related to design data and/or to supply and procurement data and/or to pre-commissioning data and/or operation data and/or facility configuration data.

18 Claims, 5 Drawing Sheets

(58) Field of Classification Search
USPC .......................................................... 707/608
See application file for complete search history.

(56) References Cited

U.S. PATENT DOCUMENTS

| | | | |
|---|---|---|---|
| 2015/0046363 A1* | 2/2015 | McNamara | G06Q 10/0833 705/333 |
| 2017/0032299 A1* | 2/2017 | Lichty | G06Q 10/06313 |

OTHER PUBLICATIONS

Carlsson, Oscar, et al., "Plant descriptions for engineering tool interoperability", INDIN 2016, Poitiers, France, Jul. 19-21, 2016, pp. 730-735.*

* cited by examiner

Fig. 1 Legend:
1-document management unit
2-decomposition unit
3-requirements management unit
4-equipment management unit
5-unit for storing and managing the structure of facility spatial decomposition
6-project management unit
7-visualization unit

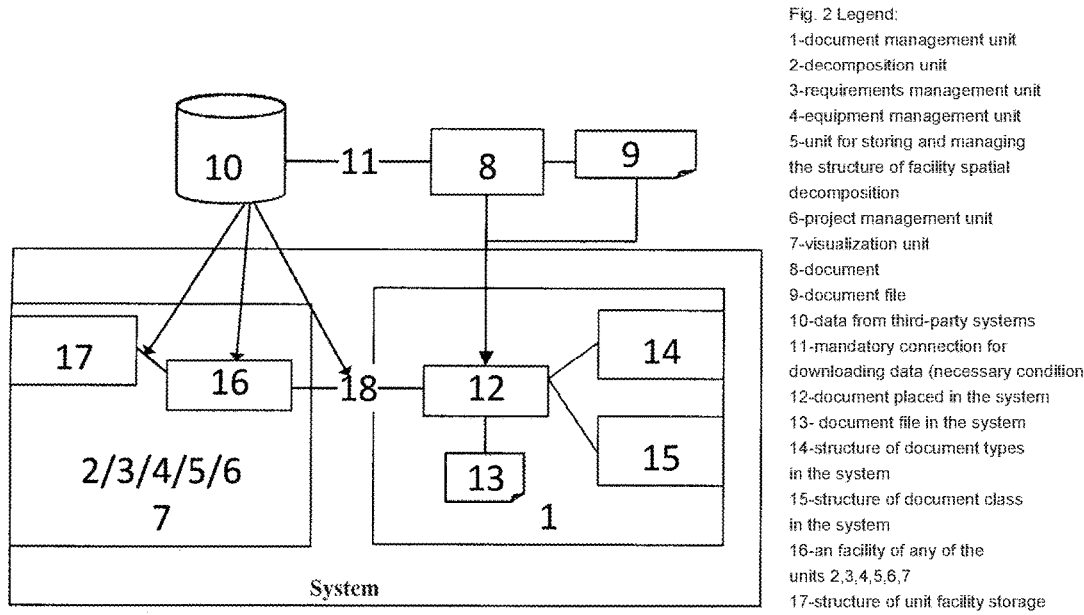

Fig. 2.

Fig. 2 Legend:
1-document management unit
2-decomposition unit
3-requirements management unit
4-equipment management unit
5-unit for storing and managing the structure of facility spatial decomposition
6-project management unit
7-visualization unit
8-document
9-document file
10-data from third-party systems
11-mandatory connection for downloading data (necessary condition)
12-document placed in the system
13- document file in the system
14-structure of document types in the system
15-structure of document class in the system
16-an facility of any of the units 2,3,4,5,6,7
17-structure of unit facility storage in units 2,3,4,5,6,7
18-connection of the facility of unit 2,3,4,5,6,7 with documents in unit 1

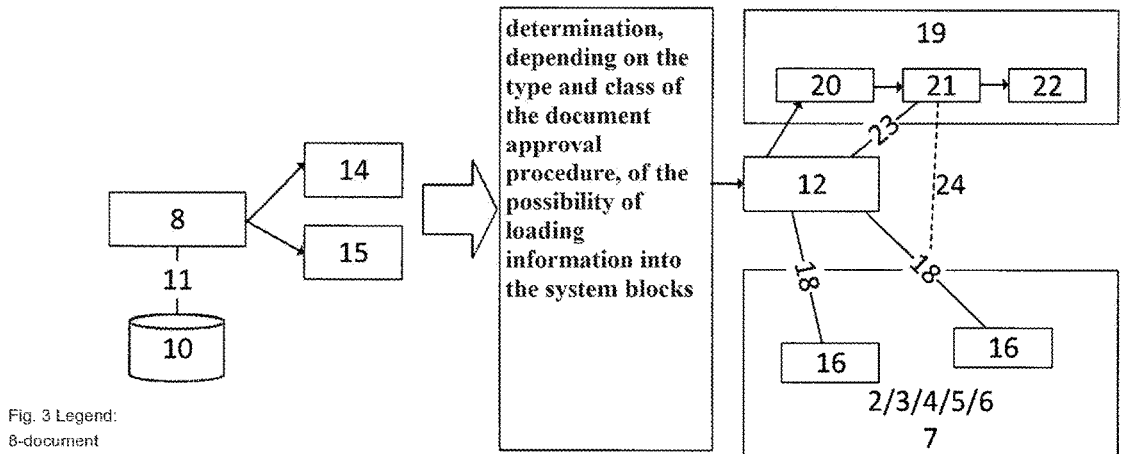

Fig. 3.

Fig. 3 Legend:
8-document
10-data from third-party systems
11-mandatory connection for downloading data (necessary condition)
12-document placed in the system
14-structure of document types in the system
15-structure of document class in the system
16-an facility of any of the units 2,3,4,5,6,7
19-document approval procedure from the set of possible procedures in the system
20, 21,22-document approval statuses in accordance with procedure 19
23-current status of document approval
24-current status of information about a unit facility

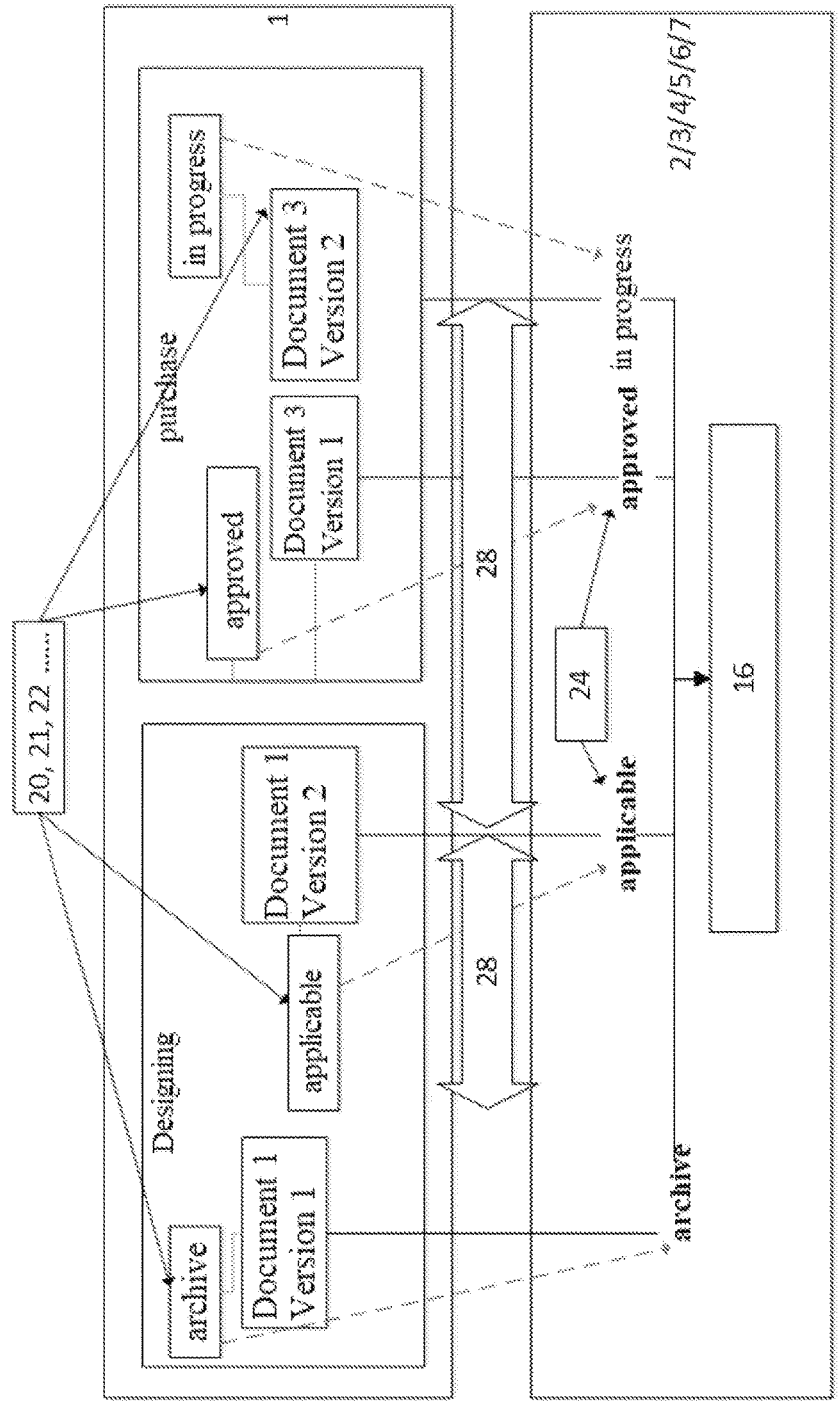

Fig. 6 Legend:
1-document management unit   2-decomposition unit   3-requirements management unit   4-equipment management unit
5-unit for storing and managing the structure of facility spatial decomposition
6-project management unit   7-visualization unit
16-an facility of any of the units 2,3,4,5,6,7
20, 21,22-document approval statuses in accordance with procedure 19
24-current status of information about a unit facility
28-the basic information about the unit facility is compared taking into account its status at any stage of the Facility life cycle

Fig. 6

METHOD FOR LIFE CYCLE MANAGEMENT OF A COMPLEX UTILITY FACILITY AND SYSTEM FOR ITS IMPLEMENTATION

CROSS-REFERENCE TO RELATED APPLICATIONS

This application is a US 371 Application from PCT/RU2017/000102 filed Mar. 1, 2017, the technical disclosures of which are hereby incorporated herein by reference.

FIELD OF THE INVENTION

The invention relates to automated control methods and can be used to manage the life cycle of complex engineering facilities, for example, such as nuclear and thermal power plants, hydroelectric power plants, etc. Applying the invention at the stages of design, construction and operation of a complex engineering facility makes it possible to identify and document the characteristics of structures, systems, and components of the facility, as well as to ensure that changes in these characteristics are properly designed, verified, approved, released, implemented, tested, recorded, and reflected in the facility documentation.

BACKGROUND OF THE INVENTION

Systems for managing the life cycle of a complex engineering facility are known (for example,
 in particular,
 of a power generating enterprise operating in the field of thermal and nuclear energy, for example,
 Siemens Teamcenter Nuclear Edition with the Archimed NXT Knowledge Management System
 3DS Optimized Plant Construction and 3DS Integrated Plant Engineering based on the Dassault Systèmes 3DEXPERIENCE platform
 Neolant Neosynthesis PLM/PDM with additional modules for CAD suppliers
 intended for
 knowledge management—collection, storage, approval/cancellation, and processing of design, technical, installation, pre-commissioning, repair and maintenance documentation, including requirements, descriptions, instructions, drawings, 2D and 3D models, lists and invoices, reports, records, and certificates, etc.,
 process management—planning (including integration with scheduling and risk management systems), decision support, verifying their compliance with the requirements of the knowledge management subsystem, compliance with procedures, as well as reflection in the knowledge management subsystem,
 configuration management—recording the changes made in the configuration management subsystem and integrating with design subsystems (including CAD—Computer Aided Design), planning and procurement (ERP—Enterprise Resource Management and SM—Supply Management), continuous production management (MES—Management Execution System), etc.

A method of document management for nuclear power plants and a system for its implementation are known (CN104517181). The system includes the client side, the processor, and the server on which the databases are located. A document is assigned a certain category in the system, in accordance with which the procedures for its processing are determined.

A power plant control system is known (U.S. Pat. No. 8,606,548), containing a database (hereinafter—DB) with documents, each of which corresponds to a data set having one or more attributes that characterize the data type related to the document.

However, these known systems and the methods implemented therein do not allow organizing control processes at all stages of the life cycle, taking into account the current status of all information about the facility.

SUMMARY OF THE INVENTION

The method and system of life cycle management of a complex engineering facility ensure configuration management, that is, they ensure the process of identifying and documenting the characteristics of structures, systems, and elements of a complex engineering facility, wherein their application ensures that changes to these characteristics are properly designed, verified, approved, released, implemented, tested, recorded, and reflected in the documentation for the facility. The technical result achieved by using the invention is to increase the speed of access to relevant and verified information at any stage of the life cycle of a complex engineering facility, in order to make safe and cost-effective decisions, as well as to increase the reliability of the process of managing (controlling) state changes of a complex engineering facility.

The specified problem is solved, and the specified technical result is achieved due to the fact that the method of managing the life cycle of a complex engineering facility is characterized by the following:

forming the structure of a complex facility, highlighting its constituent elements and the relationships between them, as well as their location in the facility decomposition structures;

forming a linked array of requirements related to a complex engineering facility and to the processes of its implementation;

planning and accounting for requirements in accordance with the structural decomposition of a complex engineering facility, wherein the requirements are assigned a certain status;

forming the DBs designed to store a linked array of information, which is at least documents related to design data and/or to supply and procurement data and/or pre-commissioning data and/or operation data and/or facility configuration data;

when loading a document, structured smart data is loaded, corresponding to the information about a facility element and/or elements and/or the relationships between them associated with the document, and which characterize the facility element(s), and the relationships between the document and the facility elements are established;

when loading smart data, pre-checking the availability of a document in the database, associated with the downloaded data; if such document is found, checking the ability to load a specific type of smart data; when confirming the ability to download the smart data, a connection is created between a facility element and the version of the loaded document, which is a data set, into which data is written from the current version of the document characterizing the related facility element:

if there is no document or if its parameters in the system do not meet the requirements, the smart data is not loaded;

establishing the applicability status of documents and structured smart data associated with the document in the system, with the possibility to compare them automatically taking into account the status of document version with which they were downloaded;

At the same time, when forming a database, a three-level system of document aggregation is used, which includes the following entities: Document package, Document set, Document; each document is correlated with a unified type and class, wherein the types of the document are determined only by its semantic part. The type and class of the document determine its behavior and the list of the relationships and procedures available for it to go through its approval (life cycle), as well as the ability to load smart data coming into the system units with it. To ensure structured storage and management of smart data, a decomposition structure of a complex engineering facility is created in the system, which provides a description and storage of the facility structure as a group of elements that perform certain functions, wherein a structure of volumetric (location) decomposition of a complex engineering facility is also created. For all documents loaded into the system, the values of at least two parameters characterizing the document are determined and assigned, based on which the procedure for approving the document is determined, as well as the ability to download related structured smart data.

The specified problem is solved, and the specified technical result is also achieved due to the fact that the system managing the life cycle of a complex engineering facility includes the following:

a document management unit for storing documents, including processes for their coordination and change, a decomposition unit for creating, storing, and managing the decomposition structure of a complex engineering facility and the configuration of the complex engineering facility, a requirements management unit designed to store individual requirements and structures for their tracing, as well as to manage the processes of their coordination and change, an equipment management unit designed to store consolidated data and structures on the elements of a complex engineering facility, providing their classification and the possibility of automated comparison of characteristics, a unit for storing and managing the structure of facility spatial decomposition, including information on the facility locations, a project management unit for storing data related to project management processes during its implementation.

All of the above units are interconnected.

The life cycle management system of a complex engineering facility can additionally be equipped with a visualization unit designed to visually identify and navigate through the elements of a complex engineering facility, which is connected to all system units. The visualization unit performs the following functions: import of 3D models from third-party systems; structured placement of 3D models in the system in accordance with a given structure, visualization of planning processes and performance of all types of activities at all stages of the life cycle of a complex engineering facility.

The document management unit performs the following functions: aggregation and structured storage of facility-related documentation; keeping the entire history of the facility documentation life cycle, including the accumulation of information on all versions of documents, indicating the status of the documents and the relationships between them; organization of various document coordination procedures; keeping a complete history of consideration and coordination of documentation, ensuring the storage of comments history for all versions/revisions of the document; support of interconnections with other units; support for attribute search and contextual search (search in the content of accounting storage units), wherein displaying the relationship of the requested document with other documents; forming reports on documents.

The decomposition unit performs the function of creating the decomposition structure of a complex engineering facility to ensure the consolidation of data on the facility from various system units.

The requirements management unit performs the following functions: organizing processes for creating and coordinating requirements; organizing structured requirements storage in the form of hierarchical structures; classifying requirements; support for accounting planning processes and requirements accounting when implementing various types of processes during the life cycle of a complex engineering facility.

The equipment management unit performs the following functions: forming the storage structure of complex engineering facility elements, defining the list of available characteristics and relationships for each structural branch; forming the storage structure of models/types of complex engineering facility elements, defining the list of available characteristics and relationships for each structural branch; importing data on complex engineering facility elements and models/types from third-party systems; accumulating all information on the elements of a complex engineering facility, taking into account its status.

A unit for storing and managing the spatial decomposition structure of the complex engineering facility provides the creation of the structure of facility volumetric (locational) decomposition, intended for organizing, entering and recording information about the location of facility elements in the facility structure.

The project management unit performs the following functions: project management, including management of terms, resources, costs (control); —supply data management (control); construction and installation data management; pre-commissioning data management; communications management, monitoring the design, completion, and construction of facilities and the links between them; comparison of planned and actual terms of documentation development and procurement and delivery of equipment at all stages of the life cycle; operational management; schedule and network planning; resource planning; making reports on the project; interaction with equipment suppliers; equipment delivery time management; assessing the timeliness of procurement and delivery procedures for each item of equipment, The totality of these units in the system and their interconnection with each other make it possible to ensure the relevance and completeness of information at any stage of the life cycle of a complex engineering facility, as well as to ensure the reliability of the process of managing (controlling) state changes of the complex engineering facility. The reliability of the process of managing (controlling) state changes of a complex engineering facility (hereinafter—"facility") is achieved by applying a clear correspondence of a complex engineering facility document status and an array of smart data associated with the document located in the system with connection with versions of documents loaded into the system, including the full scope of the necessary information on the requirements for the complex engineering facility, elements of the complex engineering facility and a consolidated 3D model of this facility. Accumulation of all data characterizing a facility element, including data from archived versions of a document, current versions and versions of a document with prospective data, throughout the entire life cycle of the facility, based on the connections between a facility element and a document, ensures quick access to any document related to a given facility element.

As smart data, system unit facilities are considered, as well as information about all the characteristics and relationships of system unit facilities, which is managed in the information system. Examples of smart data: 3D equipment model in the system, a record of a certain position of equipment in the system and characteristics of the record of equipment in the system, the connection of the 3D equipment model and records of the equipment in the system and its properties.

A system unit facility is an entity in the address space of an information system (addressing is a method of identifying the location of a facility in an information system, a system unit) that appears when an instance of information of a certain class is created/entered into the system. The class of a system unit facility means a universal, complex data type, consisting of a thematically unified set of "fields" (variables of more elementary types) and "methods" (functions for working with these fields), which is a model of an information entity with internal and external interfaces to operate its contents (field values).

The relationship between a facility element and a document version is a set of data characterizing the existence of a connection between the facility element and the current document version, and comprises information about the element, indicated in the document, as well as information about the document version.

Figure 1:
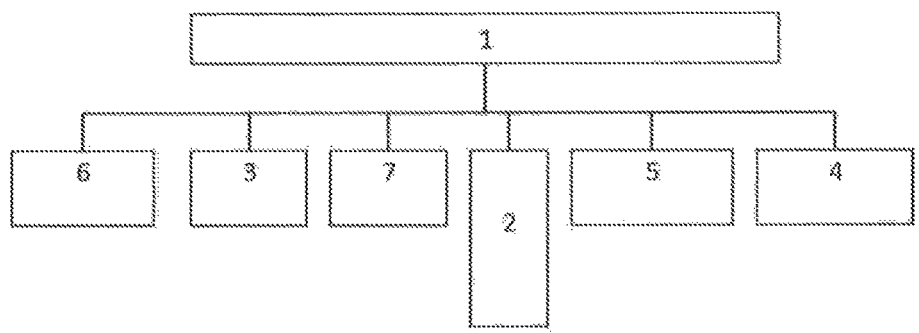
FIG. 1 shows a block diagram of the system, where: 1—document management unit; 2—decomposition unit; 3—requirements management unit; 4—equipment management unit;
5—unit for storing and managing the structure of facility spatial decomposition; 6—project management unit; 7—visualization unit.

Each unit mentioned is determined by the totality of the system unit facilities in it.

FIG. 2 shows a diagram characterizing the basic principle of loading and placing data in the system, which is as follows. Document 8 represented by document file 9 and related smart data (collectively, document 8), is placed in document management unit 1 of the system in the form of a document placed in system 12, consisting of document file 13 and its intellectual data assigned in accordance with the structure data types in system 14 and the structure of document classes in system 15 (collectively—"document in system 12"), provided that a mandatory connection was established (verified) during the download process to download data 11 of document 8 (file of document 9 and its smart data) with data from third-party systems 10, for a given type and document class, placed in units 2-7 in the form of facilities of the corresponding units 16, in the facility storage structures of unit 17 in the corresponding units 2-7. If availability of connection 11 is successfully verified, connection 18 is established between the facility of unit 2-7 and the document in unit 1. In this case, all the basic information about the facility of unit 16 is entered into the connection 18 with specific versions of documents in system 12. If there is no connection, 11 is not loaded into the system and is not processed in it. If there is no connection 11, data from third-party systems 10 is not loaded into the system and is not processed in it.

FIG. 3 shows a diagram illustrating the procedure for downloading a document and related data from third-party systems in terms of determining the procedure 19 for approving the status of a document when it is downloaded and placed in the system. When loading document 8 into the system after assigning the corresponding type 14 and class 15 to it, the procedure 19 for its approval is determined depending on the type and class of the document. In relation to a document loaded into system 12, out of the many possible procedures in the system, specific approval procedure 19 is selected, containing a set of different statuses 20, 21, 22 of the document and the order of their change. For document 12, its current approval status (23) is always determined. At the same time, the current status of information 24 about unit facility 16 is found, which is reflected in connection 18.

Figure 4:
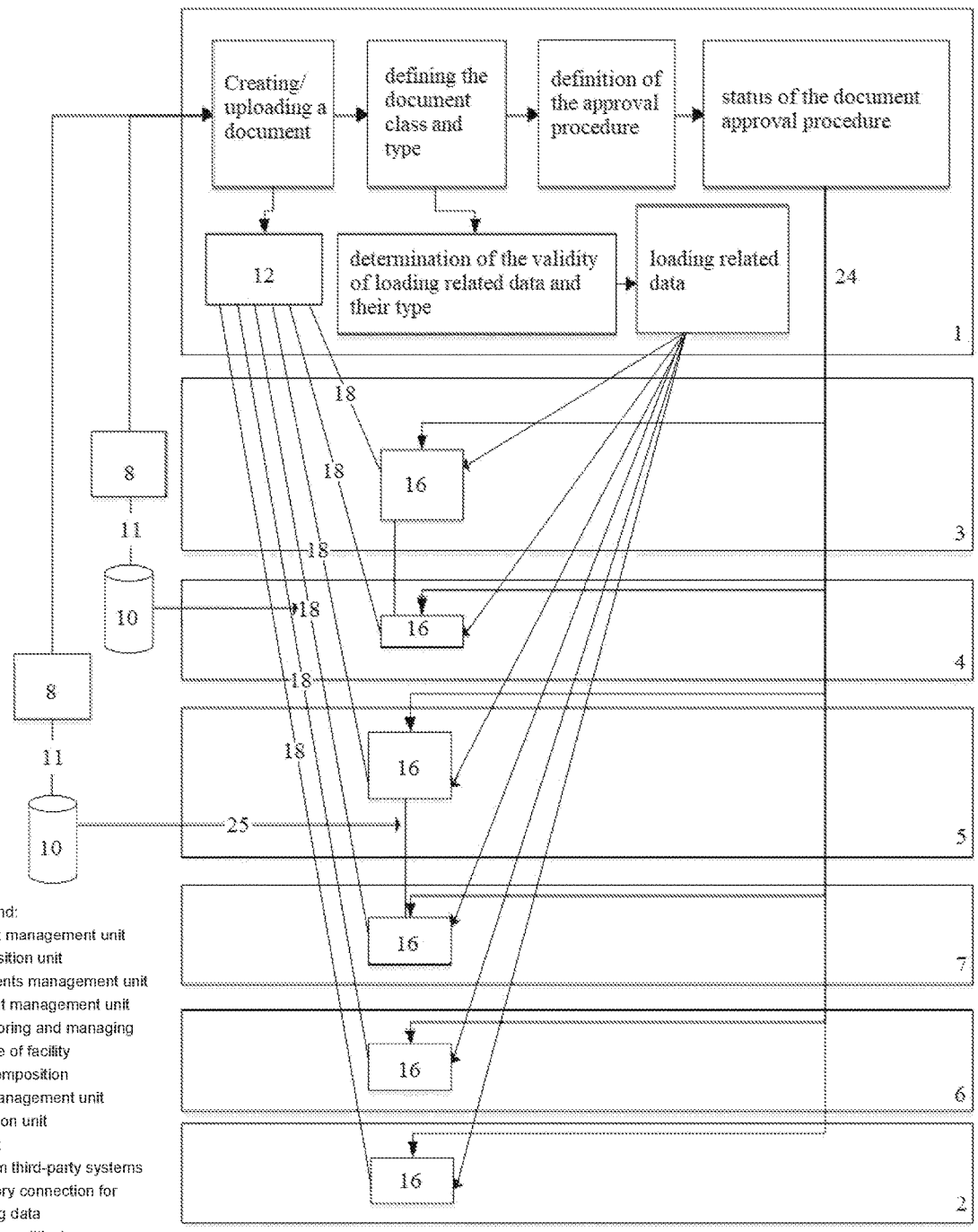

FIG. 4 is a diagram showing data loading when loading a document into the system. When loading document 8 into the system, in document management unit 1, a document placed in system 12 is formed, class 15 and type 14 of the document are determined, document approval procedure 19 is determined, as well as the permissibility of loading the smart data related to document 8 (10) and their type. If connection 1 is found, and it corresponds to that permitted for this document type and class, then connections 18 are formed between the document located in system 12 and the facilities of unit 16; in relation to the facilities of unit 16, the smart data associated with document 8 is loaded. Between the document placed in system 12, and the facilities of units 16, connection 18 is established. Moreover, the data downloaded together with the document may contain information not only on facility elements, but also on the relationships of the facilities of units 16 to each other 25. The current status of the downloaded data about the facility of unit 16 for each unit 2, 3, 4, 5, 6, 7 is taken from the status of the document version, with which it was downloaded.

Figure 5:
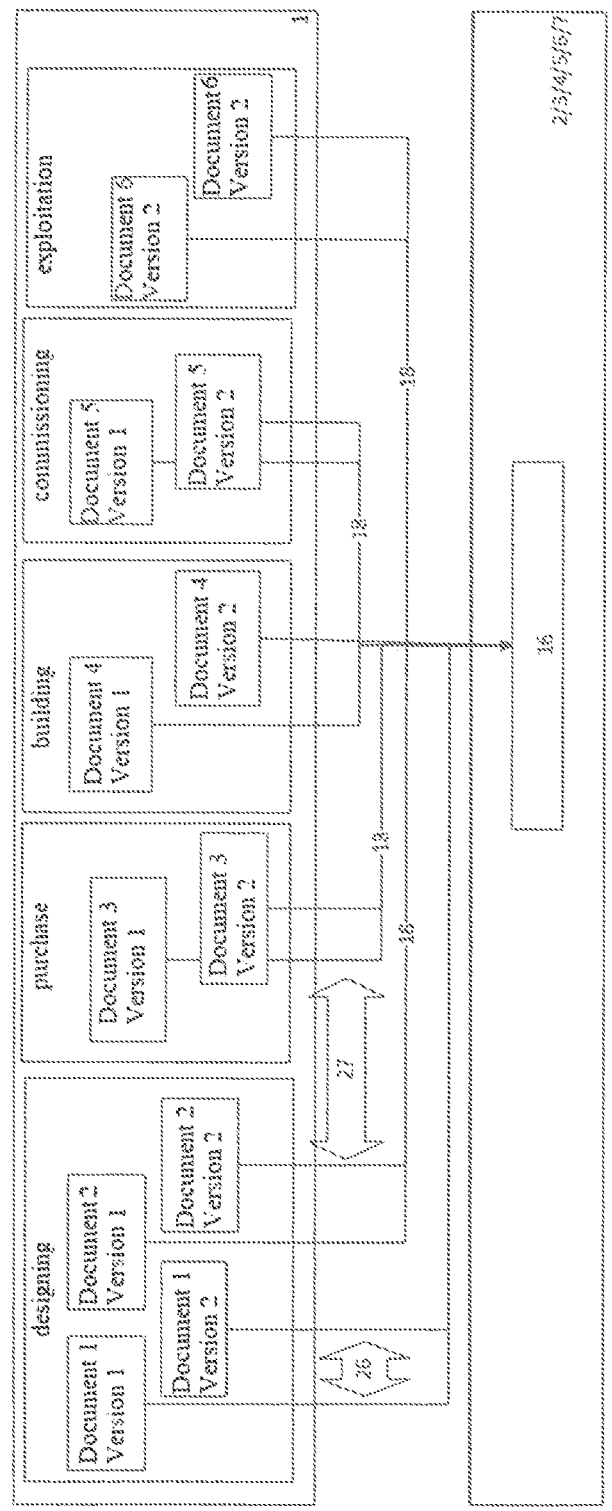

FIG. 5 and FIG. 6 show diagrams illustrating the data analysis and verification processes in the system, taking into account their status.

FIG. 5 shows that the information about the facility of unit 16, received with different versions of the same document 12 located in the system in document management unit 1, is analyzed and verified by comparing the data characterizing the facility of unit 16 and reflected in connections 18 corresponding to the different versions of document 12. FIG. 5 also shows that the information about the facility of unit 16, received with various documents 12 located in the system, in document management unit 1, at various stages of the life cycle of the Facility, is analyzed and verified by comparing the data characterizing the facility of unit 16 and reflected in connections 18 relevant to documents 12 related to the different life cycles of the facility.

FIG. 6. also shows that when comparing information about the facility of unit 16, received both with different versions of the same document 12 located in the system in document management unit 1, and with various documents 12 located in the system in document management unit 1, at various stages of the life cycle of the Facility, the information is analyzed and verified taking into account the current status 24 of information about the facility of unit 16. (The status of information about unit facilities created with the current version of the document is inherited from the status of the current version of the document (20, 21, 22))

EMBODIMENT OF THE INVENTION

The facility lifecycle management system can be implemented using well-known computer devices. The client and server side of the system can be implemented on computer devices, respectively, using well-known software, for example, Windows Server 2008 R2, ENOVIA V6 Core (STUDIO, LCS, BPS)V6R2015X HF06.

The relationship between the units that make up the system can be implemented using well-known software, for example, ENOVIA V6 Core (STUDIO, LCS, BPS), V6R2015X.

The facility life cycle management system (FIG. 1) consists of document management unit 1, decomposition unit 2, requirements management unit 3, equipment management unit 4, unit for storing and managing the spatial decomposition structure of the complex engineering facility 5, project management unit 6, visualization unit 7.

All the units mentioned above are interconnected via software interfaces.

Document management unit 1 is intended for storing documents 8, including processes for their coordination and change.

Document management unit 1 performs the following functions:

aggregation and structured storage of documentation for the Facility;

keeping the entire history of the Facility documentation life cycle, including the accumulation of information on all versions of documents, indicating the status of the documents and the relationships between them;

organization of various document coordination procedures;

keeping a complete history of consideration and coordination of documentation, ensuring the storage of comments history for all versions/revisions of the document;

support of interconnections with other system units;

support for attribute search and contextual search (search in the content of accounting storage units), wherein displaying the relationship of the requested document with other documents;

forming reports on documents.

In terms of aggregation and structured storage of facility documents, in document management unit 1, a three-level system of documentation aggregation is supported by using the following entities (classes of Unit facilities): Document package, Document set, Document. A document accumulates information on a specific element of the Facility in question. A document is, for example, a description of the system, a specification, a process diagram, a circuit diagram, an isometric diagram, a layout drawing, a list of equipment, a project needs questionnaire, a construction drawing, etc. A document can act as an independent accounting storage unit, the Document, and it may not be an accounting storage unit, but can only be used as part of the Set (Document set). Each Document is assigned a code that relates the Document to a specific type. As a unified document type classifier, a code set of the DCC system is used (IEC 61355-1 standard). Moreover, the unified system for document coding 10 and, accordingly, for determining the number of their types (14) is based on the fact that the types of a document are determined only by its semantic part (for example, there are three types of Certificates for one project, six types of Certificates for another project, however, all of them will belong to the one class "Certificates", similarly to reports, calculations, specifications, etc.) This approach makes it possible to establish the correspondence of document types from any project.

The second main criterion that determines the behavior of a document in the system is the document class. The document class is determined in accordance with the unified documentation structure (15) depending on the stage of the Facility life cycle and the purpose of the document.

A set of documents is a facility of unit I of the second information storage level. A set is a collection of Documents (in a set), either related to a single facility, or combined in accordance with documentation structure (for example, a volume or a book as part of technical design documentation). A set can be a report, explanatory note, initial technical requirements, calculation, volume (book) of technical design documentation, quality assurance program, technical solution, technical assignment, basic set of detailed drawings, specification, procedures, factory documentation, etc. A set formed or loaded into the system is an accounting unit. Using the sets makes it possible to use one unit facility, a document in a set, simultaneously in several sets at the same time to organize the change management process. The behavior of a set in the system, like that of a document, is determined by the combination of its type and class.

A document package is a facility in the document management unit 1 and is intended for aggregation of documentation according to predefined rules. A document package makes it possible to include documents of any type and class. When a package is formed, an attribute is automatically created in the attribute of the attached document, indicating the inclusion in the package.

In terms of keeping the entire history of the facility documentation life cycle, document management unit 1 ensures keeping the history of all facility documentation with the possibility of viewing it. To determine and provide information on the degree of documentation applicability, maintenance and automatic change of statuses (20, 21, 22) are organized according to the specified rules, which can be defined as a list of events (for example, document management unit 1 ensures automatic status changes for all documents and sets, acting as storage accounting units in case of a change in the status of the package, which includes the current versions of documents), and the fact of passing coordination procedures by authorized users of the system. Documentation statuses (20, 21, 22) are elements of the documentation life cycle. A type of documentation life cycle with an appropriate set of statuses is determined by a combination of type (14) and class (15) (for example, for documents of the specification type, depending on the location in the documentation structure (for example, the specification of a technical design, the specification of detailed documentation), life cycles of various types are set with their own set of statuses.

In terms of organizing the coordination of documents, document management unit 1 provides the ability to organize various procedures 19 for coordination and approval of facilities of document management unit 1 (document, set, package). When starting the coordination procedure, it is possible to set a sequence of coordination steps, assigning any number of users responsible for its implementation from a predefined list of authorized users for each coordination step (the list of users who can be designated responsible for the step is determined by the role in the system). For the procedure, the order of status changing (20, 21, 22) in the life cycle of the unit facilities during the performance of the procedure steps is determined. Availability of pre-configured procedure templates (templates for linking the steps of the coordination procedure and the statuses of the corresponding unit facilities) is provided; when using them, it is only necessary to assign the users responsible for the steps. For a number of unit facilities, it is envisaged to rigidly fix certain coordination procedures depending on their type (14) and class (15), ensuring that it is impossible to change the status of a particular unit facility (document, set, package) without going through certain steps of the assigned procedure.

In terms of keeping the entire history of document consideration and approval, including ensuring the storage of the comments history for all versions/revisions of the facilities of unit 1 (documents, sets, packages), document management unit 1 allows creating facilities of the comments and the register of comments unit (aggregator of comments for the functions of fixing transfer of comment groups). In this case, connections are created between the comment and the document version, to which they were formulated, as well as the Register into which they were entered. When re-generating the register of comments (generating responses to the comment) for the comments included in its structure, the connection is updated to the current version of the Register.

Document management unit 1 makes it possible to perform parallel consideration of comments from one register of comments by appointing a user responsible for generating responses for each specific comment. Assigning users and the procedure for generating comments, responses to comments and the generation of register of comments is carried out by applying document approval procedures. Coordinated comments, as facilities of unit 1, can serve to initiate and control change procedures.

Decomposition unit 2 is intended for storing and managing the Facility decomposition structure. Decomposition unit 2 performs the function of creating the decomposition structure of a facility to ensure the consolidation of data on the facility from various system units.

Decomposition unit 2 ensures the creation, for example, of the facility decomposition structure as a product (PBS (product breakdown structures); the structure is intended to store the structure of the Facility as a specific final list of systems (groups of facilities that perform certain functions) (facility—unit—system)). In this structure, for example, buildings/structures are considered as a system. All technical information on the facility in the system (documentation, requirements, equipment, 3D models, etc.) is associated with this structure at a level that is determined specifically for each facility of a system unit (16) in each system unit (1, 2, 3, 4, 5, 6, 7). This structure is the main means for navigating through information on the facility, planning and accounting requirements, planning the implementation of the main activities, as well as evaluating the configuration of the facility (for example, the degree of readiness of the facility or the sufficiency of documentation to start work on a certain part of the facility).

Loading and creating a structure is based on the relevant documents loaded into document management unit 1. (FIG. 2,3)

Requirements management unit 3 is designed to organize the requirements management process at all stages of the facility life cycle.

Requirements management unit 3 performs the following main functions:

organization of processes for the creation and coordination of requirements;

organization of structured requirements storage in the form of hierarchical structures;

classification of requirements;

support of accounting planning processes and requirements accounting when implementing various types of processes during the Facility life cycle.

Requirements management unit 3 may additionally perform the following functions:

visualizing requirements classification using attributes;

supporting import/export of the system requirements structure from third-party systems, for example, the Project Single Information Space (SIS);

the ability to conduct discussions and save comments on requirements, attributes and documents, taking into account their replication in third-party systems, for example, the project SIS;

support/import of connections with sources of requirements from third-party systems, for example, the project SIS;

sorting and filtering requirements;

access management.

Requirements management unit 3 provides viewing the types of relationships (connections) between different requirements—the presence of relationship attributes;

the ability to visualize the relationship between the requirement and the results of its verification;

creating general traceability reports based on information status;

creating multi-level traceability reports based on information status;

ability to conduct analyzes based on traceability reports—search for missing (unimplemented) requirements, search for requirements that do not comply with regulatory documents, etc. given information status Requirements management unit 3 works as follows: forms requirements storage structures, creates requirements in the system as unit facilities; for requirements, it is possible to establish relationships both with other requirements and with facilities of other units.

Support for various requirements management processes is mainly based on the application of various types of relationships between requirements and unit facilities that are part of the system. For the same requirement of a unit facility, it is possible to establish several types of relationships (for example, planned connection and actual connection).

Equipment management unit 4 is designed to organize the accumulation and structured storage of information on facility elements (equipment, for example, pipe valves, etc.) throughout all stages of the facility life cycle and the organization of all types of activities for managing elements of the facility at all stages of the life cycle.

Equipment management unit 4 performs the following functions:

generating the storage structure of facility elements, incl. defining available characteristics and relationships for each branch of the list structure;

generating the storage structure of facility elements models/types, incl. defining available characteristics and relationships for each branch of the list structure;

importing data on facility elements and models/types from third-party systems;

accumulation of all information on facility elements, taking into account the status.

Equipment management unit 4 operates as follows.

In accordance with each facility element, the facilities of the equipment management unit 4 (16)—"facility element" are placed in equipment management unit 4.

In equipment management unit 4, models/types of the used products (equipment) are placed as facilities of unit (16)—"model/type of facility element". Information on models/types for a particular Facility element is introduced by establishing the appropriate relationship between the facilities of the unit "facility element" and "model/type of facility element".

Equipment management unit 4 can be used to establish communications of facilities of unit 4 with other facilities of the other mentioned units of the claimed system. Information is updated in equipment management unit 4 in accordance with the general rules—only when updating the corresponding document received in management unit 1. (FIG. 2,3)

Information for each facility of equipment management unit 4 is entered in the context of the document version with which it was downloaded (that is, the facility of the unit "facility element" or "model/type of facility element" does not have its own characteristics (for example, weight, overall dimensions and other characteristics), and all necessary characteristics are entered into the system and reflected in relation to a specific document in document management unit 1 and the facility of unit 4 (as shown in FIG. 5, FIG. 6). Connection is re-established and its properties are overwritten each time a new version of the document is created, i.e. the relationship "unit facility—document version" and its characteristics characterizes the specific facility of unit 4 in the context of a specific document), (FIG. 4, 5, 6)

For each facility of equipment management unit 4, there is complete information on it with an indication of the status in accordance with the status of the document corresponding to it (FIG. 5, 6)

Unit facilities can be used when planning work due to the possibility of establishing relationships with the facilities of project management unit 6.

The unit for storing and managing the spatial decomposition structure of the complex engineering facility 5 provides the creation of the structure of facility volumetric (locational) decomposition, intended for organizing, entering and recording information about the location of facility elements in the structure, for example, building-elevation-premise (by creating connections with structural elements), as well as entering and recording information on the premises (as unit facilities) and their characteristics.

Loading and creating a structure is based on the relevant documents loaded into document management unit 1. (FIG. 2, 3)

Project management unit 6 performs the following functions:

project management (including time, resource, cost management);
  procurement data management;
  construction and installation data management;
  pre-commissioning data management;
  communication management,
  Project management unit 6
monitors the design, completion and construction of facilities and the connections between them;
comparison of planned and actual terms of documentation development and procurement of equipment at all stages of the life cycle;
  operational management;
  schedule and network planning;
  resource planning;
  forming reports for the project;
  interaction with equipment suppliers;
  equipment delivery time management;
  assessment of the timeliness of procurement and delivery procedures (planned-actual analysis) in relation to each item of equipment.

Project management unit 6 operates as follows.

The structure of project work is created in the form of unit facilities (16)—Working with these facilities it is possible to establish various types of relationships between facilities of other system units (16) (documentation, equipment, requirements, etc.)

Types of relationships characterize either the planned or actual work.

The relationships have attributes that make it possible to set the deadlines, responsible persons and the procedure for the specific work in relation to unit facilities.

In terms of communications, it is possible to create forums, groups, workrooms to ensure documentation development by a team, as well as the functions of communications when planning and implementing various work throughout the life cycle of the facility.

Visualization unit 7 is designed to provide the possibility of 3D visualization of the facility and navigation through the facility 3D model.

Visualization unit 7 performs the following functions:

importing 3D models from third-party systems wherein maintaining the required data quality;
establishing relationships between 3D models with facilities of other units (documentation, equipment);
structured placement of 3D models in the system in accordance with a given structure
visualizing the processes of planning and performing of all types of activities at all stages of the Facility life cycle (design, construction, pre-commissioning, etc.)

Visualization unit 7 operates as follows.

Visualization unit 7 has 3D facility models decomposed to the level of individual facility elements, connections between the 3D models present in the unit with other facilities of other units (documents, equipment) are established.

3D models are updated only when updating the corresponding document in unit 1; for elements of a 3D model, the status is set in accordance with the status of the corresponding 3D model of the document in unit 1. (FIG. 2.3) The claimed method can be implemented using the claimed system as follows.

At the design stage of a complex engineering facility, the requirements for the facility are identified, coordinated, and recorded; for this purpose, the requirements are downloaded into requirements management unit 3, together with document 8. At the same time, unique requirements identifiers are checked. Based on the loaded requirements, facility decomposition structures are formed. Requirements are classified in accordance with accepted classification methods. For each requirement entered into the system, connections are established both with other requirements and with facilities 16 of other units. Requirements are planned and accounted for, with responsibility being distributed by establishing appropriate relationships. The requirement and relationship between the requirements are assigned status by placing and approving the corresponding document 12 in the system. Since all information is downloaded to the communication of the facilities of units and documents (18), then a status 24 (in operation, approved, etc.) is reflected for all information in the system that cannot be changed without changing the statuses of the relevant documents (20, 21, 22). To organize the processes of changing and recording document statuses in the system, it is possible to organize both flexible and rigid procedures for coordination and approval of documentation 19.

As documentation is developed (including development of 3D and an information model in CAD), the characteristics of structures, systems, and elements of the Facility are accumulated, identified, and documented. For that end, the DBs designed to store a linked array of information, which is at least documents 8 related to design data and/or to supply and procurement data and/or pre-commissioning data and/or operation data and/or facility configuration data are formed; as well as the DBs designed to store a linked array of information, which is at least documents related to design data and/or to supply and procurement data and/or pre-commissioning data and/or operation data and/or facility configuration data, depending on the life cycle where the facility is located. When loading document 8, the document is classified (FIG. 3), by assigning it corresponding type 14 and class 15, for example, the "certificate" type, the "purchase/delivery-delivery documents" class, which, based on pre-configured templates, automatically determines the life cycle of document 12 when the Facility construction project is implemented, including all the necessary procedures for its approval (19) and the establishment of an official status indicating the responsible users of the system, (FIGS. 3 and 4). Based on class 15 and type 14 of the document, the ability to download related smart data is determined. Together with document file 9, the structured data associated with the document is loaded, which characterizes the facility element(s), and connections 18 are established, for example, between the document and the requirements and facility elements. For example, the "pump acceptance certificate" document is associated with the facility element in equipment management unit 4 "pump"—and with the requirements in requirements management unit 3, which establish the characteristics of the pump. Document status 12 determines the status of the structured data loaded with it into other units.

In equipment management unit 4, during the implementation of the facility construction project, the information about the specific facilities of the "facility element" and "model/type of facility element" unit is created/accounted for by loading the relevant documents. A wide list of documents (12) generated at various stages of the facility life cycle (design data, data on installation results, data on the results of pre-commissioning, etc.) can be associated with one facility 16 of unit 4 (FIG. 5). Information on the facilities of unit 16 is entered and recorded not directly on the facility of unit 16, but on connection 18 of the facility of unit 16 and the corresponding version of document 12. It is possible to automatically compare information on the facility of unit 16, both received with different versions of the same document 12, and received with different documents at different stages of the facility life cycle, respectively 26 and 27 (FIG. 5). All information has a status in accordance with the status of document 8. This scheme of organizing data entry and management allows, for example, during the operation phase, obtaining as quickly as possible all the necessary information on Facility elements, as well as on the documents with which it was entered, including data on the passage of all coordination procedures and comments received (FIG. 6)

At each life stage of the facility, documents and their corresponding data are accumulated. Information is always accumulated together with establishing all the necessary relationships in the system between the facilities of units 16, with the status of the associated versions of documents 12 obligatory reflected.

Establishing the relationship between documents, requirements and elements of a complex engineering facility throughout the entire life cycle and reflecting the data on the facility of unit 16 in the established connections 18 makes it possible to form, maintain, and update a connected and complete array of documents and data in the system, and is also the main mechanism for establishing and determining the status of the data in various units of the system (data status is determined by the status of the document associated with them), ensuring that not all only approved for use information, but also current data about the Facility being approved is available for all users. For example, in order to ensure the completeness of the data, all newly developed versions of a certain document and related data are loaded into the system. Such approach allows obtaining information for any system facility not only about its characteristics (attribute values), but also about their status depending on the status of the document version with which they were uploaded to the system (for example, being coordinated, approved, put into production and etc.) (FIG. 6).

On the basis of the decomposition of the facility formed at the initial stage of project development (decomposition unit 2) in the PBS (product breakdown structures), the information on facility elements is refined and updated both by creating the corresponding facilities 16 in equipment management unit 4 and by creating and refining the spatial decomposition structure of the facility in spatial decomposition structure unit 5. The PBS along with functional systems (process, electrical, etc.) comprises the buildings/structures of the facility, which are considered as a system (a list of elements that perform a specific function). Based on the decomposition approved by the PBS, the information about the facility is detailed: for functional systems in equipment management unit 4 by creating the "facility element" and "model/type of facility element", for buildings/structures, by creating the facilities of the unit structure of the spatial decomposition of the "building", "elevation", "premise" facility. Information on all elements of the facility ("facility element", "model/type of facility element", "building", "elevation", "premise"), as well as their relationships, is entered exclusively when certain documentation (documents with defined type (14) and class (15)) is downloaded into the system.

For example, at the design stage, the project specification for the functional system is used to load information on a specific facility element and its model/type into equipment management unit 4; an architectural drawing is used to download information about the premise, and the installation drawing document is used to establish connection between the facility element and the premise. The facility element, as well as the building (and associated elevated and premises) have an obligatory connection to the corresponding elements of the PBS structure. The approach of phased detailing of the PBS structure makes it possible to implement all types of requirements management activities by establishing relationships with elements of PBS structures (or elements detailing it) of specific requirements as a plan for accounting for requirements, and confirming their implementation by placing the relevant documents for facility elements, the fact of requirements fulfilment.

In terms of project management, the functionality is used to establish relationships between facility documents and facilities 16 of project management unit 6, such as items of schedules, tasks, etc. to implement and control project management processes. All types of project management activities in project management unit 6 are organized using the totality of the functionality of all units in terms of organizing procedures for approving documentation and the status of related information in the system.

The accumulation of information and the loading of data into visualization unit 7 occurs as facility documents are developed. To load data into visualization unit 7, a limited list of facility documents (specific combinations of type and class) is defined. When the corresponding data is loaded into visualization unit 7, connection is established through the PBS structure with the facilities of units 4 and 5 by facility elements contained in a particular 3D model.

INDUSTRIAL APPLICABILITY

The claimed method and system provide the ability to effectively manage the life cycle of a complex engineering facility.

The adjusted volume of interconnections and information in the system between the units allows, at various stages of the life cycle of a complex engineering facility, using the accumulated information, including its current status, both for developing and constructing the facility, and for operation and maintenance, as well as for organizing decommissioning projects.

LISTING OF REFERENCE DESIGNATIONS USED IN THE DRAWINGS

1—document management unit
2—decomposition unit
3—requirements management unit
4—equipment management unit
5—a unit for storing and managing the structure of facility spatial decomposition
6—project management unit
7—visualization unit
8—document
9—document file
10—data from third-party systems
11—mandatory connection for downloading data (necessary condition)
12—document placed in the system
13—document file in the system
14—structure of document types in the system
15—structure of document class in the system
16—an facility of any of the units 2,3,4,5,6,7
17—structure of unit facility storage in units 2,3,4,5,6,7
18—connection of the facility of unit 2,3,4,5,6,7 with documents in unit 1
19—Document approval procedure from the set of possible procedures in the system
20, 21,22—document approval statuses in accordance with procedure 19
23—current status of document approval
24—current status of information about a unit facility
25—loading data on the relationship of unit facilities between themselves
26—the ability to automatically compare basic information about the unit facility received with various versions of the same document
27—the ability to automatically compare basic information about the unit facility received with various documents, at various stages of the facility life cycle
28—the basic information about the unit facility is compared taking into account its status at any stage of the Facility life cycle.

The invention claimed is:

1. A method for managing a life cycle of a complex engineering facility, comprising:
forming a facility structure of the complex engineering facility;
selecting constituent elements of the facility structure and the relationships between the constituent elements and a location of each of the constituent elements in a decomposition structure of the complex engineering facility;
forming a linked array of requirements related to the complex engineering facility and to processes of implementation of the requirement for the complex engineering facility;
planning and accounting for the requirements in accordance with the structural decomposition of the complex engineering facility, wherein the requirements are assigned a certain status;
forming databases intended for storing an associated array of information about the constituent elements of the facility, the associated array of information comprising at least a plurality of documents related to design data and/or to supply and procurement data and/or to pre-commissioning data and/or operation data and/or facility configuration data;
loading a loaded document to provide the plurality of documents or an updated version of one of the plurality of documents, wherein the step of loading the loaded document comprises considering the performance of a smart-data-loading step, wherein the smart-data-loading step comprises loading structured smart data corresponding to the information about the constituent elements of the facility and the relationships between the constituent elements associated with the loaded document, and describing at least one of the constituent elements of the facility, and establishing relationships between the loaded document and the constituent elements of the facility;
wherein the step of considering the performance of the smart-data-loading step comprises: (i) pre-checking the availability of an associated document in the database, the associated document forming a part of the plurality of documents and being associated with the to-be-downloaded smart data; and (ii) if the associated document is found, checking the ability to load a specific type of smart data in the associated document; (iii) when confirming the ability to load the specific type of smart data in the associated document, performing the smart-data-loading step and creating a connection between a constituent element of the facility and a version of the associated document corresponding to the loaded document, the connection being a data set into which the structured smart data is written from a current version of the associated document, the current version of the associated document describing the related constituent element of the facility; and (iv) if there is no associated document or if parameters of the loaded document do not meet the requirements, the smart-data-loading step is not performed and the smart data is not loaded;
establishing an applicability status of the plurality of documents and the structured smart data associated with the loaded document in the system to enable a comparison of the plurality of documents and the structured smart data, the comparison automatically taking into account the status of a document version with which the plurality of documents and the structured smart data were downloaded; and establishing correspondence between (i) the applicability status of the loaded document for the facility and the array of smart data associated with the loaded document and entered into connection and (ii) the versions of plurality of documents uploaded into the system, the correspondence including a full scope of necessary information in (a) the requirements for the complex engineering facility, (b) the constituent elements of the complex engineering facility, (c) a consolidated 3D model of the facility, and (d) an accumulation of all the smart data describing the at least one of the constituent elements of the facility, including smart data from archived versions of the associated document, a current version of the associated document and versions of the associated document with prospective data, throughout the entire life cycle of the facility, based on the connection between the constituent element and the associated document.

2. The method according to claim 1, wherein when forming a database of the databases, a three-level system of document aggregation is used, which includes the following entities: Document package, Document set, and Document.

3. The method according to claim 1, wherein each document in the plurality of documents is correlated with a unified type and class.

4. The method according to claim 3, wherein each document types is determined only by a semantic part of the document type.

5. The method according to claim 3, wherein the type and class of the each document in the plurality of documents determines behavior of the document and a list of relationships and procedures available for the document to go through an approval life cycle of the document.

6. The method according to claim 1, wherein a register of comments is additionally formed, whereby creating connections between a comment and a document version for which the comment was formulated, as well as a register the comment was entered into; and when the register of comments is generated again, the connections of the comments that entered the register are updated to a current version of the register.

7. The method according to claim 1, comprising creating the decomposition structure of a complex engineering facility, thereby ensuring description and storage of the facility structure as a group of constituent elements that perform certain functions.

8. The method according to claim 1, comprising creating a structure of volumetric, locational, decomposition of the complex engineering facility.

9. The method according to claim 1, wherein for each loaded document in the plurality of documents, the values of at least two main parameters characterizing the loaded document are determined and assigned, and based on the values a procedure for approving the document is determined and an ability to download related structured smart data is determined.

10. A life cycle management system of a complex engineering facility, the system comprising:

a document management unit for storing documents and configured to perform processes for coordination and change of the documents;

a decomposition unit for creating, storing, and managing the decomposition structure of the complex engineering facility and a configuration of the complex engineering facility;

a requirements management unit designed to store individual requirements and structures for tracing the requirements, and designed to manage processes for coordination and change of the requirements;

an equipment management unit designed to store consolidated data and structures related to elements of the complex engineering facility, and designed to provide classification and automated comparison of characteristics for the consolidated data and structures;

a unit for storing and managing data related to a spatial decomposition structure of the facility, including information related to locations of the elements of the facility;

a project management unit designed to store data associated with project management processes during implementation of the project management processes;

wherein all of the above units are interconnected.

11. The system according to claim 10, wherein the system further comprises a visualization unit for visual identification and navigation through the elements of the complex engineering facility, the visualization unit being connected to all the other units of the system.

12. The system according to claim 11, wherein the visualization unit is configured to performs the following functions: import of 3D models from third-party systems; structured placement of the 3D models in the system in accordance with a given structure; and visualization of planning processes and performance of all types of activities at all stages of the life cycle of the complex engineering facility.

13. The system according to claim 10, wherein the document management unit is configured to performs the following functions: aggregation and structured storage of facility-related documentation; keeping an entire history of the facility documentation life cycle, including an accumulation of information on all versions of the documents, the entire history indicating a status of the documents and relationships between the documents; organization of various document coordination procedures; keeping a complete history of consideration and coordination of documentation, thereby ensuring the storage of comments history for all versions or/revisions of the documents; support of interconnections with other units; support for attribute search and contextual search, the contextual search comprising search in a content of accounting storage units, and the support comprising displaying the relationship of a requested document with other documents; and forming reports on the documents.

14. The system according to claim 10, wherein the requirements management unit is configured to performs the following functions: organizing processes for creating and coordinating the requirements; organizing structured requirements storage in the form of hierarchical structures; classifying the requirements; support for accounting planning processes and requirements accounting when implementing various types of processes during the life cycle of the complex engineering facility.

15. The system according to claim 10, wherein the equipment management unit is configured to performs the following functions: forming a storage structure of the elements of the complex engineering facility, defining a list of available characteristics and relationships for each structural branch of the storage structure of the elements; forming a storage structure of models or types of the elements of the complex engineering facility, defining a list of available characteristics and relationships for each structural branch of the storage structure of the models or the types; importing data on the elements of the complex engineering facility and models or types of the elements from third-party systems; and accumulating all information on the elements of the complex engineering facility, taking into account a status of the information on the elements.

16. The system according to claim 10, wherein the project management unit is configured to performs the following functions: project management, including time, resource management, and cost control; supply data management control; construction and installation data management; pre-commissioning data management; communication management, monitoring design, completion, and construction of facilities and links between the design, the completion, and the construction of facilities; comparison of planned and actual terms of documentation development and procurement and delivery of equipment at all stages of the life cycle; operational management; schedule and network planning; resource planning; making reports on a project; interaction with equipment suppliers; equipment delivery time management; and assessing timeliness of procurement and delivery procedures for all equipment related to the complex engineering facility.

17. The system according to claim 10, wherein the decomposition unit is configured to performs the function of creating the decomposition structure of the complex engineering facility to ensure consolidation of data on the facility from a plurality of the units of the system.

18. The system according to claim 10, wherein the unit for storing and managing data related to the spatial decomposition structure of the complex engineering facility is configured to provides creation of a structure of volumetric, locational, decomposition of the complex engineering facility, intended for organizing, entering and recording information about locations of the elements in a structure of the facility.

* * * * *